(12) United States Patent
Cserna et al.

(10) Patent No.: US 12,347,129 B2
(45) Date of Patent: Jul. 1, 2025

(54) LIGHT-BASED OBJECT LOCALIZATION

(71) Applicant: Motional AD LLC, Boston, MA (US)

(72) Inventors: Bence Cserna, East Boston, MA (US); Puneet Singhal, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 403 days.

(21) Appl. No.: 17/697,968

(22) Filed: Mar. 18, 2022

(65) Prior Publication Data

US 2023/0298198 A1   Sep. 21, 2023

(51) Int. Cl.
*G06T 7/70* (2017.01)
*B60W 50/14* (2020.01)
*B60W 60/00* (2020.01)

(52) U.S. Cl.
CPC ........... *G06T 7/70* (2017.01); *B60W 60/0027* (2020.02); *B60W 50/14* (2013.01); *B60W 2420/403* (2013.01); *B60W 2420/408* (2024.01); *B60W 2554/4026* (2020.02); *B60W 2554/4029* (2020.02); *B60W 2555/20* (2020.02); *B60W 2556/35* (2020.02); *G06T 2200/04* (2013.01); *G06T 2207/10028* (2013.01); *G06T 2207/30252* (2013.01)

(58) Field of Classification Search
CPC .................. G06T 7/70; G06T 2200/04; G06T 2207/10028; G06T 2207/30252; B60W 60/0027; B60W 2554/4026; B60W 2554/4029; B60W 2555/20; B60W 2556/35; B60W 2420/408; B60W 50/14; B60W 2420/403

USPC .......................................................... 701/25
See application file for complete search history.

(56) References Cited

U.S. PATENT DOCUMENTS

| | | | |
|---|---|---|---|
| 10,776,639 B2 * | 9/2020 | Steinberg | G01S 7/026 |
| 10,845,470 B2 * | 11/2020 | Verghese | G01S 7/4865 |
| 10,915,765 B2 * | 2/2021 | Day | G01S 7/484 |
| 11,119,219 B1 * | 9/2021 | LaChapelle | H01S 5/0265 |
| 11,275,673 B1 * | 3/2022 | Dolan | G06F 30/15 |
| 11,639,982 B2 * | 5/2023 | Day | G06V 10/751 |
| | | | 356/4.01 |
| 11,726,184 B2 * | 8/2023 | Ferreira | G01S 17/894 |
| | | | 356/4.01 |
| 11,802,831 B1 * | 10/2023 | Zhu | G01S 7/4808 |
| 11,821,987 B2 * | 11/2023 | Gunnam | G01S 17/10 |
| 11,860,292 B2 * | 1/2024 | Eberspach | G01S 7/4816 |
| 2018/0136321 A1 * | 5/2018 | Verghese | G01S 7/4865 |

(Continued)

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

(Continued)

*Primary Examiner* — Luis A Martinez Borrero
(74) *Attorney, Agent, or Firm* — Knobbe, Martens, Olson & Bear, LLP

(57) ABSTRACT

Provided are methods for light-based object localization, which can include comparing unexpected light sources to expected light sources for determination of an agent, such as a partially and/or fully occluded agent. Some methods described also include generating a trajectory for an autonomous vehicle based on the comparison. Systems and computer program products are also provided.

15 Claims, 8 Drawing Sheets

(56) References Cited

U.S. PATENT DOCUMENTS

| | | | |
|---|---|---|---|
| 2019/0079193 A1* | 3/2019 | Gunnam | G01S 7/4808 |
| 2019/0122055 A1 | 4/2019 | Stopper et al. | |
| 2019/0317217 A1* | 10/2019 | Day | G01S 7/484 |
| 2019/0318177 A1* | 10/2019 | Steinberg | G01S 7/4808 |
| 2019/0324147 A1* | 10/2019 | Day | G01S 7/4817 |
| 2020/0193181 A9* | 6/2020 | Steinberg | G06V 20/58 |
| 2020/0284883 A1* | 9/2020 | Ferreira | G01S 7/4914 |
| 2020/0310753 A1* | 10/2020 | Radu | G06F 7/32 |
| 2020/0371238 A9* | 11/2020 | Day | G06T 7/70 |
| 2021/0183026 A1 | 6/2021 | Auner | |
| 2021/0339741 A1* | 11/2021 | Rezvan Behbahani | B60W 30/0956 |
| 2022/0092983 A1* | 3/2022 | Hong | G05D 1/0278 |
| 2022/0113419 A1* | 4/2022 | Sharma | G01S 17/86 |
| 2022/0126875 A1* | 4/2022 | Hammoud | B60W 30/09 |
| 2022/0155450 A1* | 5/2022 | Gassend | G01S 17/89 |
| 2022/0163675 A1* | 5/2022 | Goetz | B60W 40/02 |
| 2023/0097121 A1* | 3/2023 | Schwartz | G05B 13/0265 |
| | | | 701/26 |
| 2023/0213610 A1* | 7/2023 | Eberspach | G06V 40/166 |
| 2023/0243919 A1* | 8/2023 | Day | G06V 10/60 |
| | | | 356/4.01 |
| 2023/0298198 A1* | 9/2023 | Cserna | B60W 40/02 |
| 2024/0027760 A1* | 1/2024 | Beckman | G02B 27/0101 |
| 2024/0103125 A1* | 3/2024 | Steinberg | G01S 17/04 |

OTHER PUBLICATIONS

Great Britain Office Action issued for Application No. GB 2204955.5, dated Oct. 3, 2022.

Korean Office Action issued for Application No. KR 10-2022-0053463, dated Feb. 29, 2024.

Korean Office Action issued for Application No. KR 10-2022-0053463, dated Sep. 4, 2024.

Korean Office Action issued for Application No. KR 10-2022-0053463, dated Mar. 28, 2025.

* cited by examiner

LIGHT-BASED OBJECT LOCALIZATION

BACKGROUND

Autonomous vehicles can use a number of methods and systems for determining agents which may affect a trajectory of the autonomous vehicle. However, autonomous vehicles have difficulty in determining, detecting and/or tracking agents which are partially or fully occluded.

DETAILED DESCRIPTION

Figure 1:
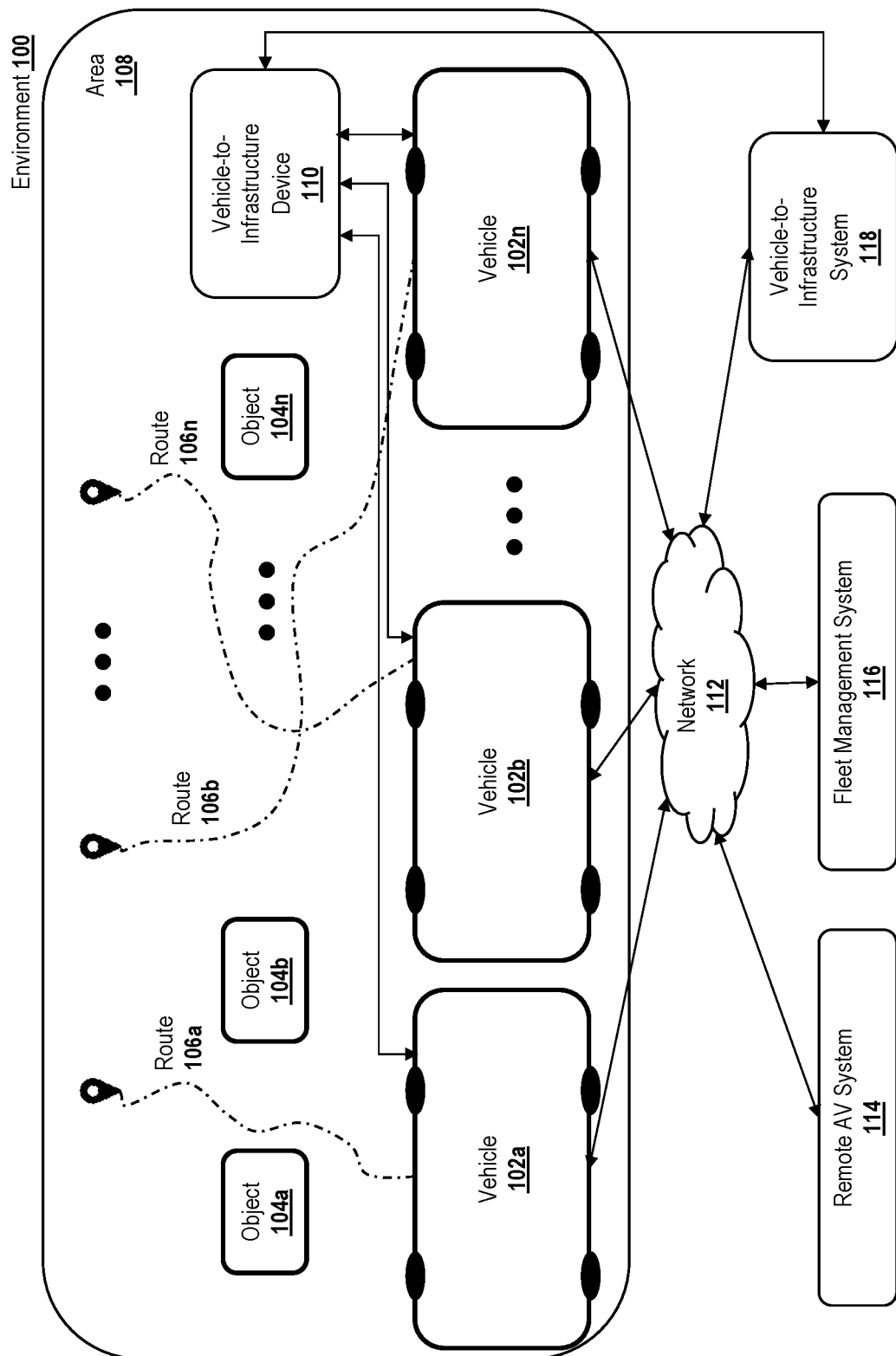
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement light-based object detection, such as via headlights from a vehicle, for determining agents in an environment of the autonomous vehicle. This may be particularly advantageous for determining occluded agents.

By virtue of the implementation of systems, methods, and computer program products described herein, techniques for light-based object localization can improve the accuracy of a trajectory of an autonomous vehicle. For example, the disclosed techniques can identify potential interacting agents prior to the autonomous vehicle sensors detecting the actual object as an agent, via determining unexpected light sources. The identification made can allow for advance warning to an autonomous vehicle of a potential interaction with an agent, especially for those which may be occluded by the autonomous vehicle. Further, by virtue of the implementation of certain techniques described herein, autonomous vehicles (AVs) can benefit from an improved safety, and a faster, and more accurate and robust generation of a trajectory.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
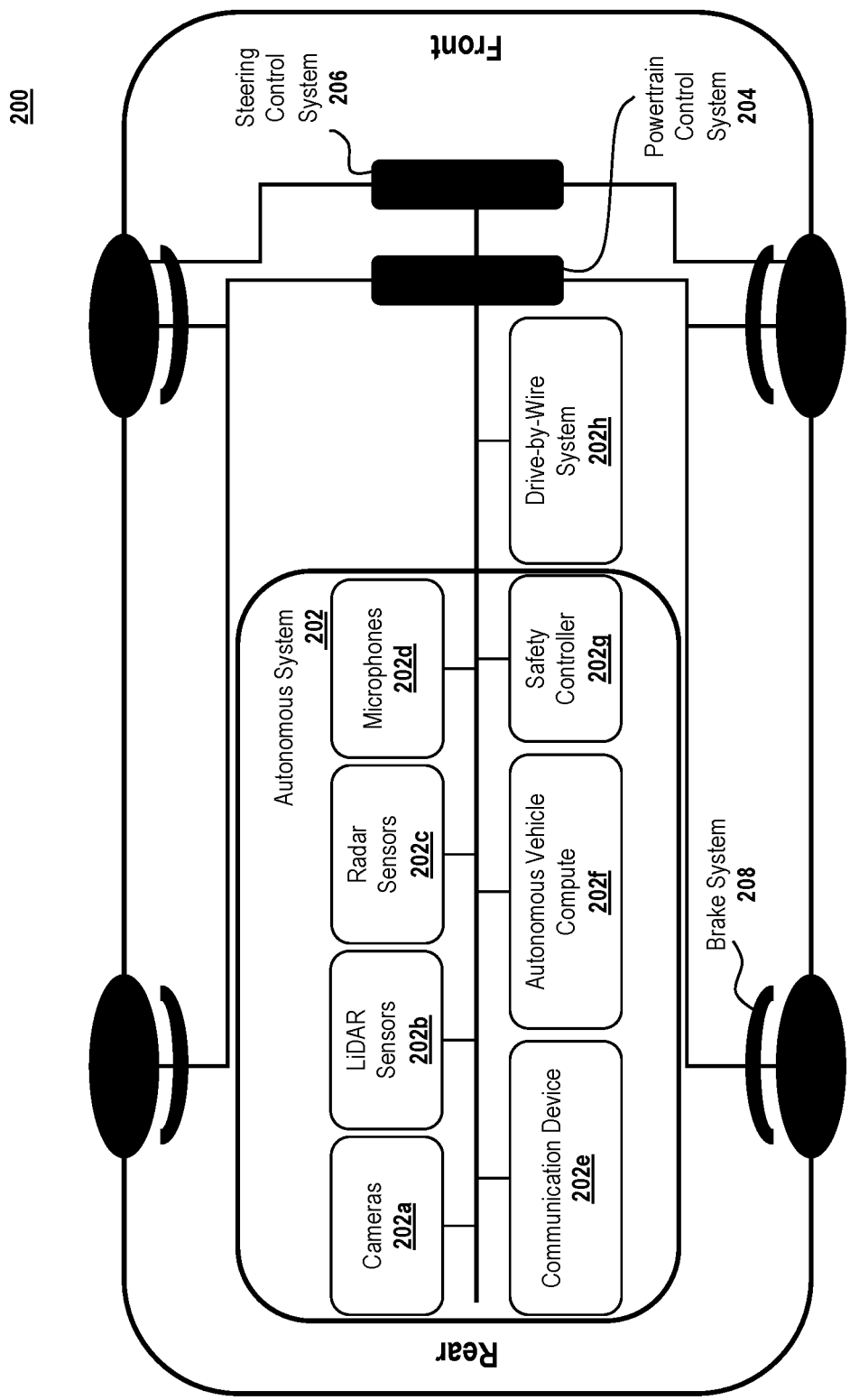
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and safety controller 202*g*.

Figure 3:
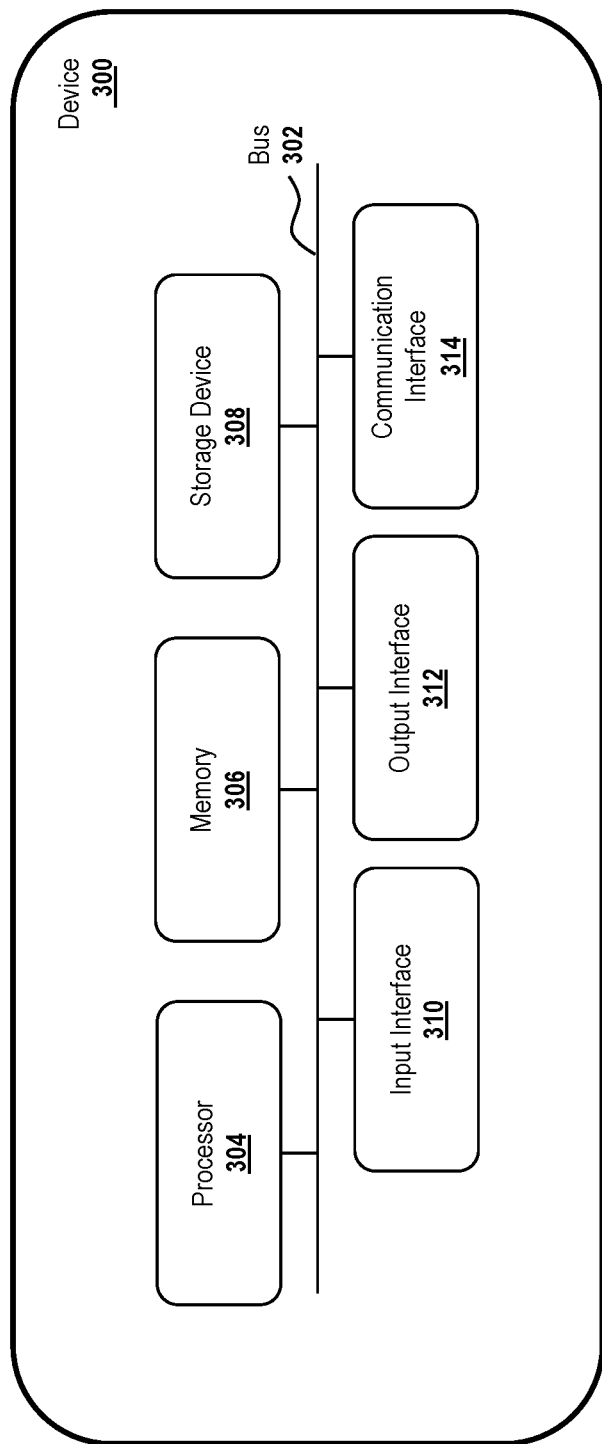
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

Figure 7:
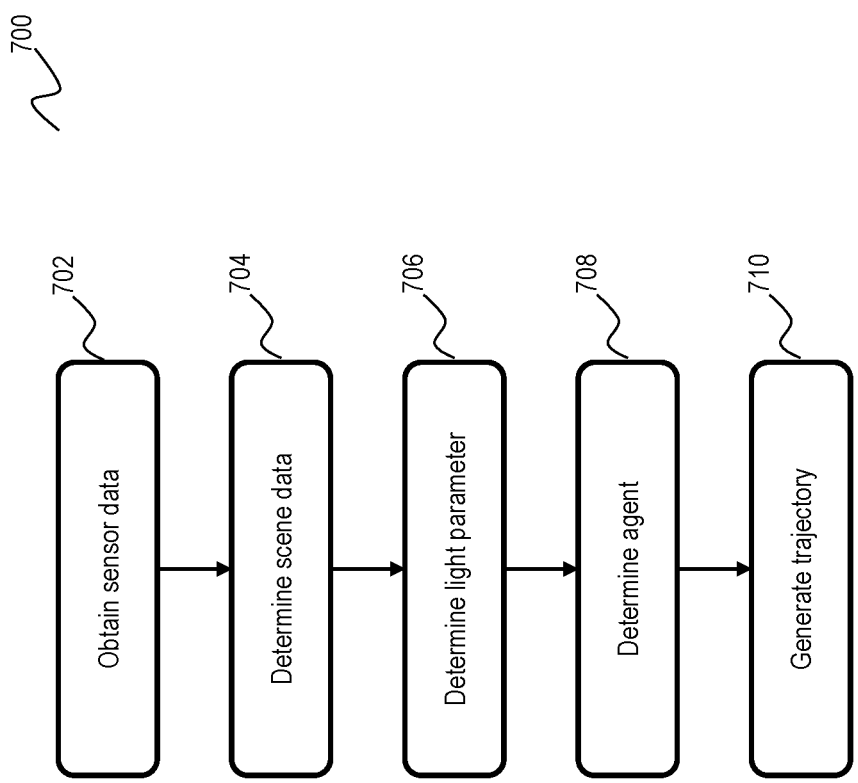
FIG. 7 is a flowchart of an example process for light-based object localization.

In some embodiments, device 300 is configured to execute software instructions of one or more steps of the disclosed method, as illustrated in FIG. 7.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
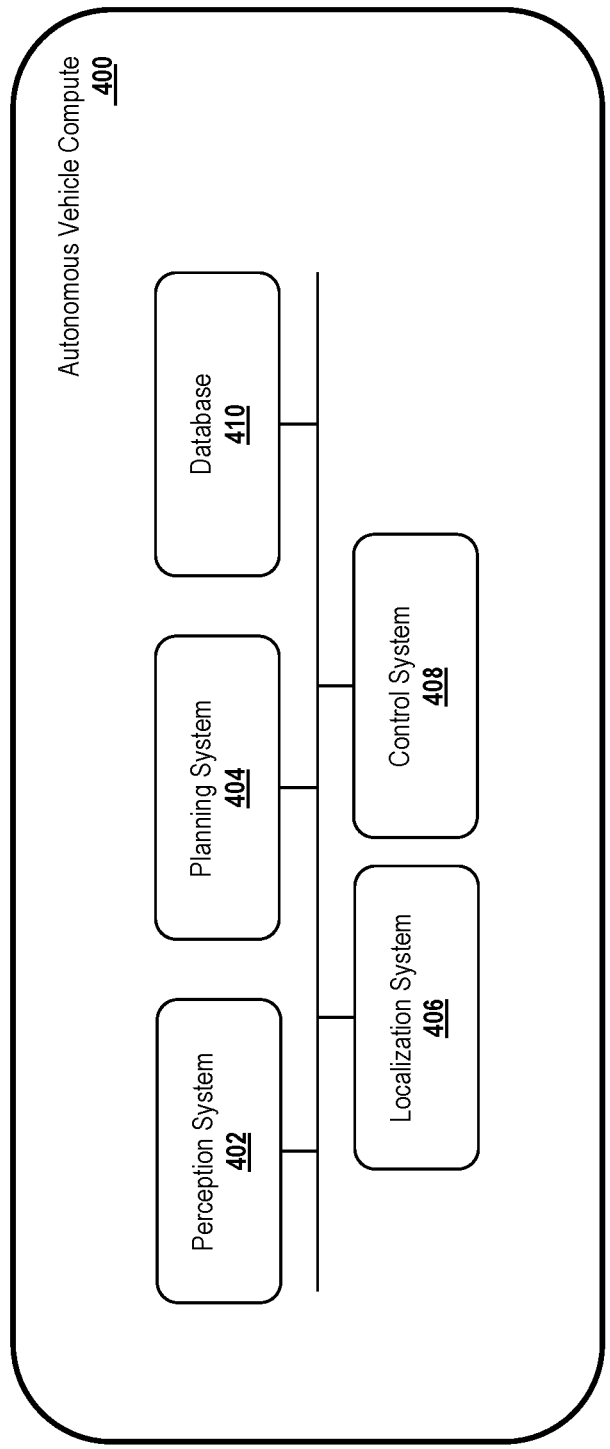
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
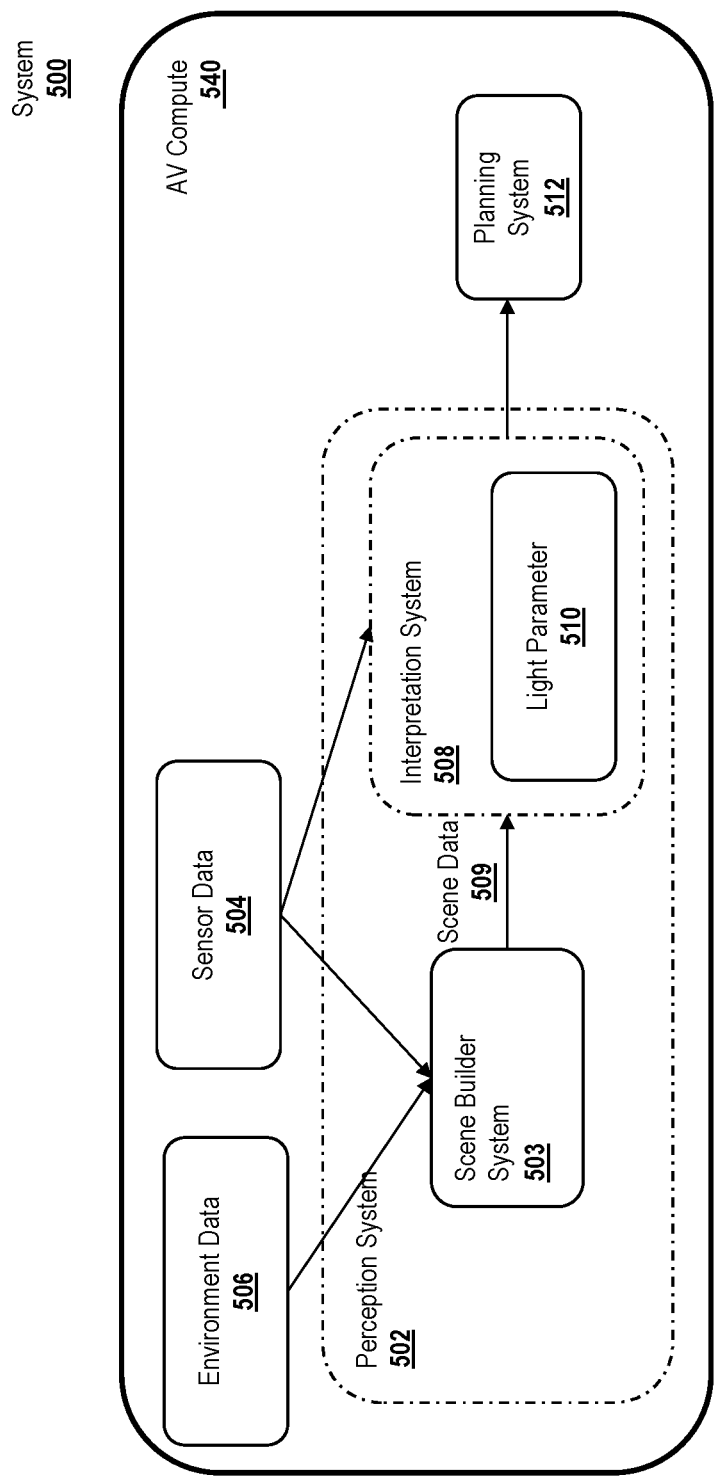
FIG. 5 is a diagram of an example implementation of a process for light-based object localization.

Referring now to FIG. 5, illustrated is a diagram of a system 500 of a process for light-based detection of an agent. In some embodiments, system 500 includes an AV compute 540, and a vehicle (similar to vehicle 200 of FIG. 2, such as an autonomous vehicle). In some embodiments, system 500 is the same as or like an AV (e.g. illustrated in FIGS. 2, 3 and 4), an AV system, a remote AV system, a fleet management system, and/or a V2I system. The system 500 can be for operating an autonomous vehicle. The system 500 may not be for operating an autonomous vehicle. An agents can be a physical object located in the environment. Agents can include all or some physical objects located in the environment. The type of agent can be set by a system or a user. The type of agent can be determined automatically, such as through sensing and machine learning. Example agents include, but are not limited to, road users, such as other vehicles, pedestrians, and bikers. In one or more embodiments or examples, an agent of the plurality of agents can include an object capable of a dynamic movement over time. An agent can be any object that is captured by a sensor, or included in a sensor data 504. For example, a road user can be an agent.

For example, the present disclosure can relate to systems, methods, and computer program products that provide for light-based detection of one or more agents, such as one or more occluded agents, such as one or more moving agents. The determination of agents can be particularly challenging in scenarios where the occluded agent or object was not visible prior to an area of interaction. The systems, methods, and computer program products can build, such as generate, data indicative of a scene of an environment, such as a temporal scene, for example by using one or more sensors. The systems, methods, and computer program products can provide for analysis and/or interpretation of the scene, such as to determine where there may be an unexpected light intensity, and whether the unexpected light indicates a presence of an agent. The systems, methods, and computer program products can then take two inference methods for determining a potential agent based on the unexpected light intensity. For example, sampling-based simulations can be used, essentially simulating a number of potential types of agents to find one that would fit the unexpected light intensities. For example, reverse light tracing can be used to determine a candidate agent and its potential trajectory.

Disclosed herein is a system 500. In one or more embodiments or examples, the system 500 can include at least one processor. In one or more embodiments or examples, the system 500 can include at least one memory storing instructions thereon that, when executed by the at least one processor, cause the at least one processor to obtain sensor data 504 associated with an environment in which an autonomous vehicle is operating. In one or more embodiments or examples, the system 500 (e.g. via the at least one processor) determines, based on the sensor data 504 and environment data 506, scene data 509 indicative of an expected scene representative of the environment. In one or more embodiments or examples, the system 500 (e.g. via the at least one processor) determines, based on the scene data 509 and the sensor data 504, a light parameter 510 indicative of an unexpected light source in the environment. In one or more embodiments or examples, the system 500 (e.g. via the at least one processor) determines, based on the light parameter 510, an agent in the environment. In one or more embodiments or examples, the system 500 (e.g. via the at least one processor) generates, using the at least one processor, based on the agent, a trajectory for the autonomous vehicle.

Advantageously, the system 500 can be used for determining agents via a light parameter 510, such as light intensity. For example, the system 500 can detect agents that are occluded by objects surrounding an autonomous vehicle by using light emitted by the agents, and possibly reflected and/or scattered around the agents. For example, the system 500 can utilize the light intensity emitted by an agent to determine the agent's location in an occluded area. The system 500 can be especially useful for bicycles, as bicycles have headlamps, similar to vehicles, but tend to be more occluded, leading to a more dangerous situation when a bicycle comes into view.

The sensor data 504 can be obtained from one or more sensors, such as a first sensor, such as an onboard sensor. The first sensor can be associated with the autonomous vehicle. An autonomous vehicle can include one or more sensors that can be configured to monitor an environment where the autonomous vehicle operates, such as through sensor data 504. For example, the monitoring can provide sensor data 504 indicative of what is happening in the environment around the autonomous vehicle, such as for generating trajectories of the autonomous vehicle. Sensors can include one or more of the sensors illustrated in FIG. 2. The sensor data 504 can include real-time sensor data, such as live sensor data. The sensor data 504 can include sensor data received in real-time. The sensor data 504 can be active sensor data.

The sensor data 504 can be one or more of: radar sensor data, non-radar sensor data, camera sensor data, image sensor data, and LIDAR sensor data. The particular type of sensor data 504 is not limiting. In one or more embodiments or examples, the sensor data 504 can be obtained from one or more of: a camera, a light-intensity sensor, and a LIDAR sensor.

The environment data 506 can be seen as data indicative of the environment in which the AV operates, such as light data of the environment, e.g. indicative of the light environment in a given location, e.g. presence of light pole(s). The environment data 506 can be predetermined or predefined data indicative of the environment. The environment data 506 can be stored data, such as in a database and/or a memory. The environment data 506 can be obtained from storage, such as database and/or a memory. The environment data 506 can be obtained from a database. For example, the environment data 506 can be stored in the memory of system 500. The environment data 506 can be obtained by the system 500. For example, the environment data 506 can be stored on a server, such as a cloud server. The environment data 506 may not be real-time data. The environment data 506 can be offline data. The environment data 506 can be remote data. The system 500 can be configured to access, such as obtain, the environment data 506.

The environment data 506 can be data stored in a database indicative of scenes, such as indicative of predetermined scenes. Predetermined scenes can include previous scenes that have been encountered in the environment, and/or expected scenes for the given environment. The scene can be represented by, or indicated by, scene data. A scene can be portion of the environment, such as a portion of the environment data 506, that the autonomous vehicle is located in.

For example, a scene can be an expected scene, such as a previous scene, such as predetermined scene. A scene indicated by environment data can be defined by data stored and possibly updated from time to time but not updated in real-time. An expected scene can be seen as a scene which is predetermined scene. The expected scene can be a scene provided by the environment data. The environment data 506 can be data stored in the system 500. The expected scene can include known objects, such as known light, in the environment. A scene can be a scene that the autonomous vehicle has encountered. A scene can be a scene that other autonomous vehicles have encountered.

Scene data (e.g. scene data 509) can be seen as data indicative of an expected scene representative of the environment. The scene data can include topographic data indicative of buildings, roads, road users, crosswalks etc.

For example, the environment data 506 can be indicative of what a scene is expected to include in a given location, time of day, weather, and known light sources. The time of day can be used to infer light intensity. The environment data 506 can provide what the environment "should" include. For example, the environment data 506 can be indicative of expected light intensity on surfaces under various predefined or predetermined world conditions, such as time of the day and weather. Given the current environment conditions around the autonomous vehicle, the environment data 506 can be obtained.

In one or more embodiments or examples, the environment data 506 includes data indicative of one or more predetermined light sources. For example, the predetermined light sources are indicated by environment data stored in the environment data 506, such as the database. The predetermined light sources can be, for example, stationary light sources. The predetermined light sources can include one or more of: light poles, lighted signs, light from buildings, construction lights, and infrastructure lights. The environment data 506 can store data indicative of the predetermined light sources at different times and conditions. The environment data 506 can store data indicative of all known light sources in the environment. The environment data 506 can store data indicative of an intensity of the one or more predetermined light sources. The environment data 506 can store data indicative of a location, such as a position, of the one or more predetermined light sources.

The scene data 509 can be based on the sensor data 504, such as live and/or real-time sensor data, as well as based on the environment data 506, such as stored predetermined environment data. The scene data 509 can be determined by a perception system 502, such as similar to perception system 402. The system 500 can be configured to use a scene builder system 503 to determine the scene data 509. The scene data 509 can be determined via mapping and/or projection, for example, 2D to 3D mapping and/or projection.

The scene data 509 can be determined from both the environment data 506 and the sensor data 504. For example, the sensor data 504 can be used to determine the given location, time of day, and weather, which can be used to determine a relevant portion of the environment data 506. Based on the combination of the environment data 506 and the sensor data 504, scene data can be determined by system 500, e.g. by perception system 502, e.g. by scene builder system 503. Scene data 509 can be representative of a portion of the environment data 506 under certain temporal conditions indicated by the sensor data 504. The scene data can be a temporal scene, such as a real-time scene.

For example, the environment data 506 includes data indicative of a city at many different times and conditions. The sensor data 504 can be used to determine the particular portion of the city, as well as the time and condition, that the autonomous vehicle is travelling in. The scene data 509 can be a more filtered temporal subset of the environment data 506, e.g. a more focused temporal subset. The scene data 509 can be a subset of the environment data 506.

The scene data can be indicative of an expected scene. The scene data can be indicative of an expected current scene that the autonomous vehicle is traveling in. For example, the scene data is indicative of what an autonomous vehicle, and in particular sensors of an autonomous vehicle, "should" detect and/or sense at a particular instant, in particular for stationary objects in the environment.

In one or more embodiments or examples, the scene data includes a three-dimensional scene data. For example, the scene data is a three-dimensional map of the environment, such as of the scene. The scene data can include, for example a three-dimensional map. The scene data can include, for example, a two-dimensional map. The scene data can be a representation of two-dimensional data in a three-dimensional map.

In one or more embodiments or examples, the scene data (e.g. scene data 509) includes one or more of: a location parameter indicative of a location of the autonomous vehicle, a time parameter indicative of a time of day, and a weather parameter indicative of a weather condition of the environment.

For example, the scene data 509 includes parameters indicative of the current conditions of the environment. These parameters can provide parameters indicative of an expected scene representative of the environment. As light conditions can change depending on the type of day and the weather, the sensor data can be advantageous for determining what is an unexpected light source in the environment. The location parameter, time parameter, and/or weather parameter can be indicated by the sensor data 504. The location parameter, time parameter, and/or weather parameter can be indicated by data other than the sensor data 504.

In one or more embodiments or examples, to determine the scene data includes to determine, based on one or more of a stereoscopic scene builder, a LIDAR scene builder, and a sensor fusion scene builder, the scene data. For example, a 3D model of the environment is built by the system 500 based on sensor data 504 and/or environment data 506. The 3D model can include known light sources, such as indicated by the environment data 506.

For example, image sensors are used to obtain sensor data 504 which can be incorporated into stereoscopic scene builder. The stereoscopic scene builder can be configured to, based on the sensor data 504, generate a real-time scene for the scene data 509. For example, a LIDAR is used to obtain sensor data 504 which can be incorporated into a LIDAR scene builder. The LIDAR scene builder can be configured to, based on the sensor data 504, generate a real-time scene for the scene data 509. Other types of scene builders can be used as well, and the particular type of scene builder is not limiting.

In one or more embodiments or examples, multiple types of sensors are used for generating sensor data 504 to be obtained by the system 500. The different types of sensor data 504 can be combined, such as merged and/or fused, together. This combined sensor data can be incorporated into a sensor fusion scene builder. The sensor fusion scene builder can be configured to, based on the sensor data 504, generate a real-time scene for the scene data 509.

Based on the scene data 509, and further based on the sensor data 504, a light parameter 510 indicative of an unexpected light source in the environment can be determined by the system 500. The light parameter 510 can be determined in a perception system 502, such as similar to perception system 402. The light parameter 510 can be determined in an interpretation system 508. An unexpected light source can be seen as a light source which is not predetermined. An unexpected light source can be seen as a light source which is not indicated by the environment data, and/or the scene data.

The sensor data 504 can be used, by the system 500, to determine light sources in the environment that the autonomous vehicle is operating in. The sensor data 504 can be compared, by the system 500, to the scene data 509, which can include known light sources from the environment data 506. The system 500 can determine where an unexpected, such as an un-predetermined, unknown, new, light source is found in the environment around the autonomous vehicle. For example, the system 500 compares detections of the light sources from the sensor data 504 with indications of light sources in the environment data 506.

An unexpected light source can be indicative of an agent present (e.g. travelling through) in the environment. For example, an unexpected light source is indicative of headlights of a vehicle that can be partly occluded. An unexpected light source can be a light of a bicycle that can be partly occluded. The unexpected light source can be indicative of a reflection on an agent, such as if a pedestrian is wearing reflective clothing. The unexpected light source can be indicative of an agent that is not occluded by any objects in the environment. The unexpected light source can be indicative of an agent that is, at least partly, occluded in the environment. The system 500 can be configured to modulate the lights, such as headlights, of the autonomous vehicle during obtaining of sensor data 504. For example, the system 500 can momentarily turn off the headlights to obtain the sensor data 504 with more accuracy. This can advantageously remove the impact of the autonomous vehicle light and/or decrease noise in sensor data.

The unexpected light source can be indicative of reflected light from an agent, such as on a surface. The agent itself can be occluded by an object in the environment, and it can be particular advantageous for the system 500 to determine that there can be an agent even if the agent itself is occluded from the system 500.

In one or more embodiments or examples, the light parameter is not indicative of the one or more predetermined light sources. For example, the light parameter 510 is not indicative of a light source known by the environment data 506 and/or provided in the scene data 509. The one or more predetermined light sources are not indicated by the light parameter, so the system 500 can generally ignore, such as filter out, when the sensor data 504 is indicative of light sources that are the same as the one or more predetermined light sources.

In one or more embodiments or examples, the light parameter is indicative of an unexpected light intensity in the environment. For example, the sensor data 504 is indicative of a light source that is in the same location as the one or more predetermined light sources. However, the sensor data 504 can be indicative of a light intensity which is greater than a light intensity of the one or more predetermined light sources. An agent can be causing this increased light intensity, and therefore the system 500 can take the greater light intensity of a predetermined light source into account and can determine the light parameter 510 indicative of an unexpected light intensity.

In one or more embodiments or examples, the system 500 (via the at least one processor) updates, based on the scene data 509, the environment data 506. The updating of the environment data 506 can include training the environment data 506 based on the scene data 509, such as by storing learned scene data. The system 500 can be configured to exclude objects that are not permanent in the scene data 509. The environment data 506 can be updated based on the temporal scene and/or the light parameter 510.

For example, the system 500 determines a light parameter 510 indicative of an unexpected light. The system 500 can determine that the light parameter 510 indicative of an unexpected light is not an agent, but instead is a newly installed lamp, e.g. based on contextual data (such as agent being stationary longer than a time threshold, such as location in altitude of the light detected, such as a detected shape of the agent). The system 500 can be configured to update the environment data 506 with this newly installed lamp, and the environment data 506 can be determined to not be indicative of an unexpected light source from the newly installed lamp in the future.

The light parameter 510 can be indicative of an unexpected light source. The light parameter 510 can be indicative of an unknown light source. The light parameter 510 can be indicative of a light source that is not a predetermined light source indicated in the environment data. The light parameter 510 can be indicative of a light source not indicated in the environment data 506. The light parameter 510 can be indicative of a light intensity that is not indicated in the environment data 506. The light parameter 510 can be indicative of a differential of a light source indicated by the sensor data 504 and a predetermined light source in the environment data 506.

The system 500 can be configured to use the light parameter 510 for determining agents and/or potential agents. In other words, the system 500 can be configured to determine, based on the light parameter 510, an agent in the environment, such as a presence of an agent in the environment. Stated differently, the system 500 can be configured to detect, based on the light parameter 510, an agent in the environment.

Determining an agent can include determining a presence of an agent in the environment that the autonomous vehicle is located in. The agent can be an actual agent that can interact with the autonomous vehicle. The agent can be a potential agent, such as a candidate agent.

The system 500 can be configured to generate, e.g. based on the determined agent, a trajectory. For example, a planning system 512, such as similar to planning system 404, is used to generate a trajectory, based on the determined agent. The system 500 can be configured to generate, e.g. based on the determined agent, a plurality of trajectories. The generated trajectories can be trajectories so that the autonomous vehicle does not negatively interact with the agent, such as causing damage to the agent, such as colliding with the agent.

Further, the system 500 can be configured to operate, such as control, the autonomous vehicle, based on the trajectory. The system 500 can operate the autonomous vehicle to follow the generated trajectory.

In one or more embodiments or examples, they system 500 is configured to determine the agent in the environment by determining, based on the sensor data 504 and the light parameter 510, an agent location in the environment.

The agent location can be indicative of a location of the agent in the environment. The agent location can be indicative of a location of the agent with respect to the autonomous vehicle. The agent location can be different from a location of the unexpected light source indicated by the light parameter. The agent location can be different from a location of the unexpected light source indicated by the light parameter for example due to reflection and other scattering of light from the unexpected light source.

For example, the system 500 determines a light parameter 510 indicative of an unexpected light source. From the light parameter 510, the system 500 can determine an agent. For example, the light parameter 510 is indicative of the agent itself, such as the headlights of a vehicle driving down a street. The agent location can be determined as the location of the unexpected light source.

In certain situations, the light parameter 510 can be indicative of reflected light. For example, the agent can be emitting or shining a light, such as a headlight, which is reflected off a surface. The unexpected light source can thereby be a surface reflecting the light, and not the agent itself. Example surfaces include walls, vehicles, signs, and roads. The unexpected light source can be a patch of light. The location of the unexpected light source may not be the agent itself in the reflection, and thus the agent location may be different from the location of the unexpected light source. The system 500 can be configured to determine a location of the agent from the reflected light source.

The system 500 can be configured to determine based on the reflection where the agent location is. To do so, the system 500 can determine a candidate location, which can be a potential or possible position of an agent based on the light parameter 510 indicative of a reflected unexpected light source. The agent location can be a candidate location of the agent. For example, the agent location is a predictive location of a potential agent, such as a predictive location of a candidate agent.

In one or more embodiments or examples, the system 500 determines the light parameter 510 by determining, whether the sensor data 504 meets a criterion. In one or more embodiments or examples, in response to determining that the sensor data 504 meets the criterion, the system 500 can determine the light parameter 510 by determining that the light parameter 510 indicates a presence of unexpected light in the environment.

In one or more embodiments or examples, in response to determining that the sensor data 504 does not meet the criterion, the system 500 (as part of the light parameter determination) determines that the light parameter does not indicate a presence of unexpected light in the environment.

The criterion can be based on a light intensity threshold. The criterion can be based on a light intensity threshold at a particular criterion location. Upon determining that the light parameter is indicative of a light intensity value greater than the light intensity threshold at a given location, the system 500 can determine that the sensor data 504 meets the criterion. Upon determining that the light parameter is indicative of a light intensity value equal to or less than the light intensity threshold at the given location, the system 500 can determine that the sensor data 504 does not meet the criterion.

The criterion can indicate whether the unexpected light intensity meets a particular value. The particular value can be a value compared to the environment data 506.

The light intensity threshold can be set to zero where the environment data 506 and/or the scene data 509 is not indicative of a light source. For example, any light source would meet the criterion, as there should not be light in that particular location.

The light intensity threshold can be set above zero. For example, there can be an amount of unexpected light indicated by the sensor data 504 that may not meet the light intensity threshold, even in locations where the scene data 509 is not indicative of a light source. This may help avoid false positives from minor reflections, such as from streetlights.

In one or more embodiments or examples, the system 500 is configured to determine the agent by determining, based on the light parameter, a candidate location associated with a candidate agent. In one or more embodiments or examples, the system 500 is configured to determine the agent by generating, based on the scene data and the light parameter, a light propagation result for the candidate agent at the candidate location. In one or more embodiments or examples, the system 500 is configured to determine the agent by determining, based on the light propagation result, the agent. In one or more embodiments or examples, the system 500 is configured to determine the agent by determining, based on the light propagation result, a candidate agent.

The candidate agent may or may not be an actual agent. The candidate agent may be indicative of a potential agent, such as a predicted agent. The candidate location may or may not be a location of the actual agent location. The candidate location may be indicative of a potential, such as predicted, location of an agent. The candidate location may or may not be a location of a candidate agent. The candidate location may be based on learned data, such as extracted data. The candidate location may be based on a model, such as an expert model for identifying areas where an agent could reside based on the light parameter. An expert model can be an analytical model that takes in geometric/physical information about the world, such as via sensor data 504, like lane markings/boundaries and/or lane directions. The expert model can create an initial set of candidate locations based on the geometric/physical information. For example, for sensor data 504 indicative of a lane with a direction pointing away from the autonomous vehicle position, the system 500 can be configured to filter out any vehicle head light and it would not have impact on the light intensities observed. The system 500 can be configured to identify locations, such as areas, where an agent could reside.

The system 500 may be configured to determine a plurality of candidate agents, each of the plurality of candidate agents having a corresponding candidate location. A model, such as an expert model, may identify candidate locations as areas in which the candidate agent could reside.

Information regarding candidate agents may be stored, such as in the system 500. The candidate agents may be extracted from data and for example indexed in the system 500. For example, the system 500 can access data associated with any number of candidate agents. The candidate agents can have associated candidate agent information, such as respective types of agent.

A light propagation result can be generated for each candidate agent at each candidate location, e.g. based on sampling-based simulation. The light propagation result can be indicative of how a candidate agent at a candidate location would cause a light source. For example, the light propagation result is indicative of where a light source by the candidate agent would be reflected by a surface in the environment. The light propagation result may be based on the scene data and the light parameter for comparison.

For example, the light propagation result is compared to the light parameter. If there is a match between the light propagation result and the sensor data 504 and the light parameter 510, the candidate agent with the associated candidate location may be determined as the agent. For example, the light parameter 510 is indicative of an expected light map, which can be compared to the light propagation result, (e.g. generated light map) to determine if an agent is present. The system 500 can be configured to store any matches for future use for a sampling-based simulation.

The system 500 can be configured to determine if the light propagation result meets a light threshold. In accordance with a determination that the light propagation result meets the light threshold, the system 500 can determine a best match indicative of the candidate agent. In accordance with a determination that the light propagation result does not meet the light threshold, the system 500 may not determine a best match indicative of the candidate agent.

If there is not a match between the light propagation result and the sensor data 504 and the light parameter 510, the candidate agent with the associated candidate is not correct. The system 500 may move to either a new candidate agent or a new candidate location. For example, the system 500 can be configured to use sampling-based simulation(s). For example, the system 500 can repeatedly randomly sample known agent types and locations for such agents. Known agent types can include one or more of: agent size, agent light position, agent model.

For example, number of samples is fixed or bounded by a sampling time to scale with the scene complexity. The number of samples can be based on using heuristics, such as model-based and/or learned, to guide the sample selection. The light propagation result may be determined based on a 3D engine to simulate the light propagation.

The system 500 can be configured to repeatedly (optimally randomly) sample known agent types and locations. An agent type can indicate one or more of: size, light position, and agent model. A fixed number of samples can be performed by the system 500. A number of samples bounded by a sampling time to scale with complexity of the scene can be used. Heuristics, such as model-based or learned, can be used to guide the sampling by the system 500, which may allow for faster agent determination.

The system 500 can be configured to determine the candidate agent providing the best light propagation result as compared to the light parameter 510. The best candidate agent can then be selected, (and the best candidate agent information can optionally be stored in the system), and the system 500 can repeat the determination of the light propagation result, such as if time or iterations for candidate agents are remaining. After all light propagation results are determined for the respective candidate agents and candidate locations, the system 500 can determine the agent. The best candidate agent at the best candidate location can be the candidate agent that produces a light source closest to the light source indicated by the light parameter 510.

The system 500 can be configured to determine if the candidate agent meets a light threshold. In accordance with a determination that the candidate agent meets the light threshold, the system 500 can determine a best candidate agent indicative of the candidate agent. In accordance with a determination that the candidate agent does not meet the light threshold, the system 500 may not determine a best candidate agent indicative of the candidate agent. The system 500 can be configured to compare candidate agents, such as comparing light propagation results of the candidate agents, for determination of a best candidate agent. The system 500 can be configured to rank the light propagation results of the candidate agents. The system 500 may determine the best candidate agent as the candidate agent having the highest ranked light propagation result.

In one or more embodiments or examples, to determine the light propagation result for the candidate agent at the candidate location is based on a type of agent. The system 500 can repeatedly randomly sample known agent types and their properties, such as their features. Properties of an agent type can include one or more of size, light position, make, and model. The different agent types can be stored, such as in a database, for access by the system 500.

In one or more embodiments or examples, the type of agent includes one or more of: a vehicle, a car, a motorcycle, a pedestrian, and a bicycle. A type of agent can be a type of a vehicle. This includes, for example, a make and/or a model of the vehicle. The system 500 can have access to a number of different types of agents, which can be used to generate the light propagation result. For example, a car can produce a different light, such as intensity and/or position, than a truck or a motorcycle. Further, different types of cars can produce different types of lights. The system 500 can iteratively check the different types of agents that it has access to for determination of the agent from the candidate agent.

In one or more embodiments or examples, the system 500 is configured to determine the agent by determining, based on the light parameter (e.g. 510), a predictive candidate location associated with a candidate agent. In one or more embodiments or examples, the system 500 is configured to determine the agent by generating, based on the scene data and the light parameter, a reverse light tracing result at the predictive candidate location. In one or more embodiments or examples, the system 500 is configured to determine the agent by determining, based on the reverse light tracing result, the agent. The reverse light tracing can be seen as a reverse ray tracing in some examples.

The system 500 can be configured to use reverse light tracing for determining the agent. The system 500 can be configured to use camera-based ray tracing. The system 500 can be configured to simulate virtual camera-based ray tracing. The system 500 can be configured to simulate the ray tracing by starting at the location indicated by the light parameter 510 where a candidate agent could reside and move backwards to determine the agent.

Based on the light parameter 510, the system 500 can be configured to determine a predictive candidate location associated with a candidate agent. The candidate agent can be the same or different as the candidate agent discussed above. The predictive candidate location can be candidate locations at which agents could, or could likely, or are predicated to, appear.

A reverse light tracing result can be generated based on the scene data and the light parameter 510. Based on this, a reverse light tracing result can be performed, such as by the system 500, at the predictive candidate location.

For example, a virtual "camera" is positioned at the location indicated by the light parameter 510. The system 500 can then be configured to simulate backwards from that location towards a candidate agent at a candidate location for determination of the agent. This process can be faster than a sampling process, and can require less operational power, such as less computational power.

For example, a light propagation result indicative of a light propagation from a lit surface to another area is simulated, by system 500 on the scene data, such as represented by a 3D map. A 3D engine included in system 500 can be used to simulate the light propagation from the lighted surfaces, indicated by the light parameter 510, to other areas of the scene. The simulation can be based on a virtual bounded volume of the light parameter 510. Virtual cameras can be placed, in the simulation, in the scene at candidate locations at which agents could (or likely) appear. The virtual cameras can be placed at the headlight position of the candidate agents. The virtual cameras can be distributed in space and orientation in these areas, such as by considering the lane orientation.

The system 500 can determine if the virtual camera, for a candidate agent at a predictive candidate location, would collect light similar to a predefined (e.g. expected and/or typical) output for the candidate agent at the predictive location. If so, the system 500 can determine the agent as the candidate agent at the predictive candidate location. If not, the system 500 can determine a new candidate agent or a new predictive candidate location.

Reverse light tracing simulation and/or sampling-based simulation can be seen as part of the disclosed inference method carried out by system 500, e.g. by interpretation system 508.

In one or more embodiments or examples, the system 500 is configured to determine the agent by determining, based on the sensor data 504 and the light parameter 510, an agent trajectory parameter indicative of a trajectory of the agent.

For example, the system 500 ignores, such as filters out and/or discards, non-relevant agents based on the agent trajectory parameter. The system 500 can predict where an agent will move, and if the predicted agent motion will not affect the autonomous vehicle, the system 500 can be configured to filter out the agent.

In one or more embodiments or examples, the system 500 is configured to determine the light parameter by determining, based on the sensor data 504 and the scene data 509, a differential scene indicative of differences in light intensity between the environment data 506 and the sensor data 504. In one or more embodiments or examples, the light parameter 510 is based on the differential scene.

For example, the differential scene is a 3D scene. The differential scene can be similar to the scene data, except that it only is indicative of unexpected light source(s) indicated in the light parameter and not indicative of predetermined light source(s). For example, the differential scene is a simplified version of the scene represented by the scene data, emphasizing a representation of the unexpected light source(s).

In one or more embodiments or examples, the system 500 (e.g. via the at least one processor) generates, based on the agent, an advance warning indication. For example, the advance warning indication is provided to a user and to the AV stack and/or planning system, anticipating an agent coming into an area of direct sensing by the AV.

For example, the advance warning indication is provided to a user, such as on a display in the autonomous vehicle. The advance warning indication can indicate that an agent can potentially interact with the autonomous vehicle. This can be advantageous if a user is exiting the vehicle, in order to avoid a potential agent (e.g. a bicycle in a bicycle lane, or a vehicle in a lane where the AV door is to open) in the environment.

The system 500 can generate the trajectory for the autonomous vehicle based on the advance warning indication. The system 500 can then be aware of a potential agent action, and take any necessary controlling steps to avoid the agent.

Figure 6A:
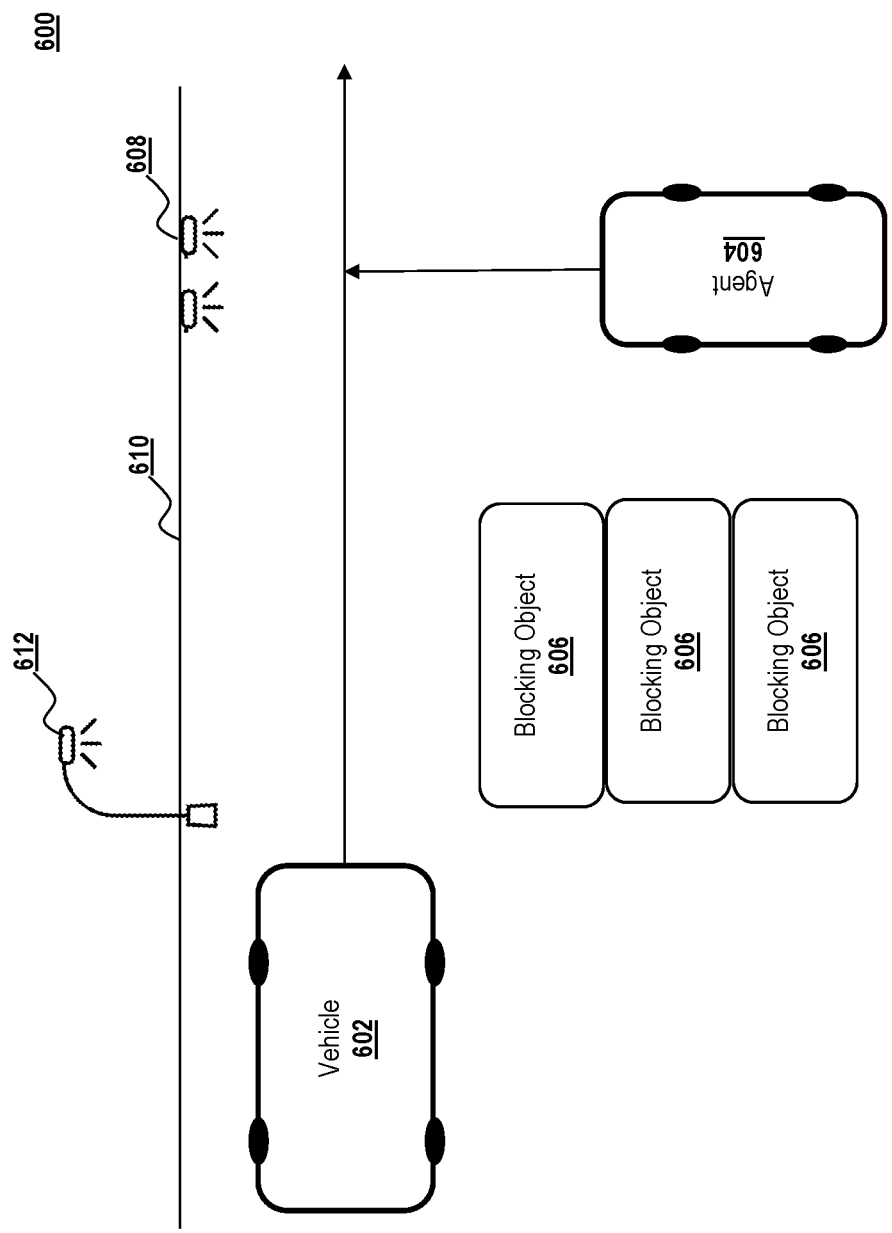
FIGS. 6A-6B are diagrams of an example implementation of a process for light-based object localization.
Figure 6B:
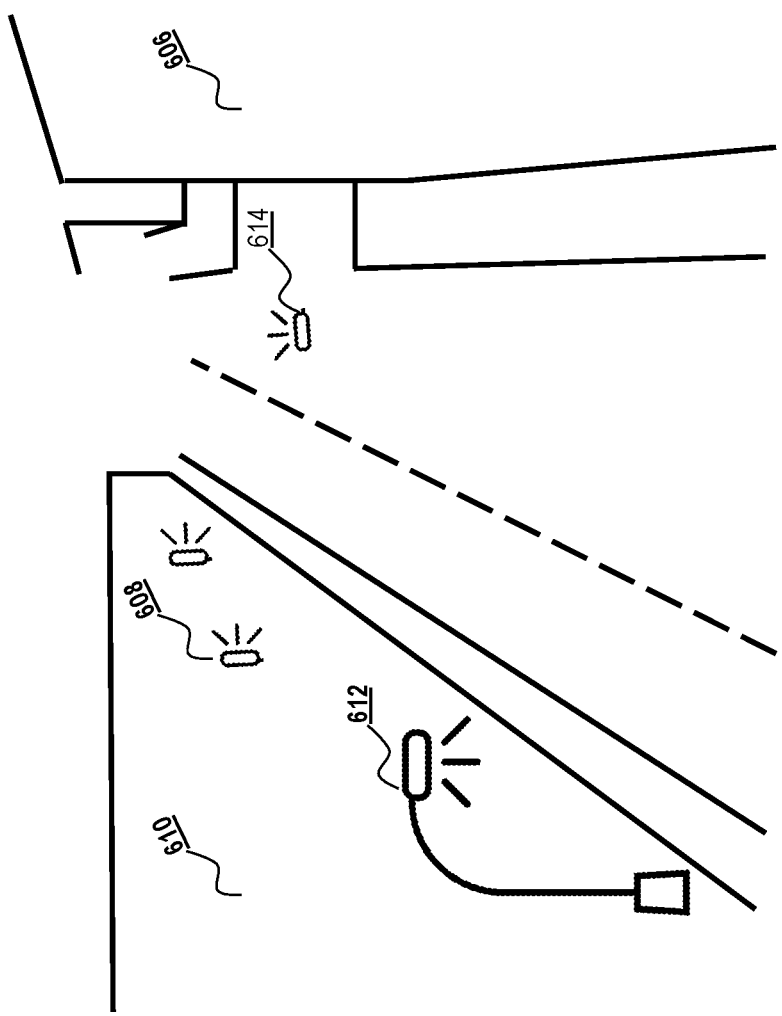

FIGS. 6A-6B are diagrams of an implementation 600 of a process for light-based object localization according to the disclosure. FIG. 6A illustrates a top-down view of a potential scenario that an autonomous vehicle 602 can face while travelling through an environment. As shown, there is an agent 604 in the environment, but it is occluded by a number of blocking objects 606. Therefore, the autonomous vehicle 602 may not be aware of the agent 604.

The agent 604 produces a reflection 608 of its headlights on surface 610. The autonomous vehicle 602 can include sensors which can detect such reflections 608. However, the sensors of the autonomous vehicle 602 would also detect the light from streetlight 612.

According to the disclosure, the autonomous vehicle 602 can combine sensor data (such as sensor data 504 of FIG. 5), which can indicate light sources, with known environment data (such as environment data 506 of FIG. 5). The known environment data can include all known light sources, which in this case includes the light from streetlight 612. The autonomous vehicle 602 can determine scene data, based on sensor data and environment data, which is indicative of an expected scene representative of the environment. As the streetlight 612 is "known" by the autonomous vehicle 602 via environment data, it is an expected light source and the autonomous vehicle 602 can ignore it.

However, the autonomous vehicle 602 can determine a light parameter indicative of unexpected light sources, which in this case includes reflections 608 as they are not stored in the environment data of the vehicle. Based on the light parameter, the autonomous vehicle 608 may be aware of an agent 604 which produces the reflections 608, such as discussed in detail herein. The autonomous vehicle 602 can then generate a trajectory, such based on slowing down, speeding up, changing direction, in order to avoid the agent 604. As the autonomous vehicle 602 can be aware of the agent 604, even though it is occluded, safe operation of the autonomous vehicle 604 can be performed.

FIG. 6B illustrates what the autonomous vehicle 602 would detect and/or sense (e.g. "see") while travelling down a road. As shown, blocking objects 606 prevent the autonomous vehicle 602 from seeing the agent 604 that is behind the blocking objects 606.

The autonomous vehicle 602 can detect the reflections 608 on the surface 610, as well as a reflection 614 on the road. Accordingly, the autonomous vehicle 602 can determine the agent 604, and its location, based on the reflections 608 allowing the autonomous vehicle 602 to safely operate.

Referring now to FIG. 7, illustrated is a flowchart of a method 700, such as a process, for light-based object localization. The method can be performed by a system disclosed herein, such as an AV compute 40, and a vehicle 102, 200, 602 and a device 300 of FIGS. 1, 2, 3, 4, 5, and 6A-6B. The system disclosed can include at least one processor which can be configured to carry out one or more of the operations of method 700.

In one or more embodiments or examples, the method 700 includes obtaining, at step 702, using at least one processor, sensor data associated with an environment in which an autonomous vehicle is operating. In one or more embodiments or examples, the method 700 includes determining, using the at least one processor, based on the sensor data and environment data, scene data indicative of an expected scene representative of the environment at step 704. In one or more embodiments or examples, the method 700 includes determining, using the at least one processor, based on the scene data and the sensor data, a light parameter indicative of an unexpected light source in the environment at step 706. In one or more embodiments or examples, the method 700 includes determining, using the at least one processor, based on the light parameter, an agent in the environment at step 708. In one or more embodiments or examples, the method 700 includes generating, using the at least one processor, based on the agent, a trajectory for the autonomous vehicle at step 710.

The method 700 can be a method for determining one or more agents via light intensity. The sensor data can include real-time sensor data, such as live sensor data. The environment data can include data stored in a database indicative of scenes, such as scenes that are expected, such as scenes that have been encountered. The environment data can be indicative of what a scene is expected to include in a given location, time of day, weather, and known light sources. The environment data can provide what the environment "should" include.

The scene data can be an expected scene, such as an expected current scene, such as a temporal scene, such as a real-time scene. The scene data can include a 3D map. The scene data can include a 2D map. The light parameter can be indicative of a light source not found in the environment data. The light parameter can be indicative of a light intensity differential.

The presence of an agent in the environment can be determined at step 708. An agent can be seen as any object in the environment, such as any object capable of dynamic movement. For example, the agent can be a candidate agent, or a potential agent.

In one or more embodiments or examples, determining the agent in the environment at step 708 includes determining, using the at least one processor, based on the sensor data and the light parameter, an agent location in the environment. For example, a location of the agent is determined, such as with respect to the autonomous vehicle, such as a candidate location of an agent.

In one or more embodiments or examples, determining the light parameter at step 706 includes determining, using the at least one processor, whether the sensor data meets a criterion. In one or more embodiments or examples, determining the light parameter at step 706 includes generating, using the at least one processor, based on the scene data and the light parameter, a light propagation result for the candidate agent at the candidate location. In one or more embodiments or examples, determining the light parameter at step 706 includes determining, using the at least one processor, based on the light propagation result, the agent.

For example, the method 700 includes optionally determining a candidate agent. The candidate agent can be based on a learned, such as extracted from data, or expert model. The method 700 can identify which areas a candidate agent could reside.

The light propagation result can be obtained for each candidate agent at each candidate location, such as based on sampling-based simulation. For example, the method 700 includes repeatedly randomly sampling known agent types, such as size, light position, model, and locations for such agents. For example, a number of samples can be fixed or bounded by a sampling time to scale with the scene complexity. The number of samples can be based on using heuristics (model based or learned) to guide the sample selection. The light propagation result can be determined based on a 3D engine to simulate the light propagation. The light propagation result can be compared to ground truth once the autonomous vehicle has entered the area where the expected agent is, such as by obtaining sensor data indicate of the area. The comparison with ground truth can be learned heuristics, and can be used for sample selection.

The determination of the agent at step 708 can be based on comparing the light parameter and the light propagation result. For example, the light parameter is indicative of an expected light map, which can be compared to the light propagation result, (e.g. generated light map) to determine if an agent is present. For example, the candidate agent providing the best light propagation result can be selected (and optionally saved) and the method can repeat the determination of the light propagation result (if time or iterations are left).

In one or more embodiments or examples, determining the light propagation result for the candidate agent at the candidate location is based on a type of agent. For example, the method 700 includes repeatedly randomly sampling known agent types and their properties (e.g. size, light position, model).

In one or more embodiments or examples, the type of agent includes one or more of: a vehicle, a car, a motorcycle, a pedestrian, and a bicycle. The type of vehicle can include a make and/or a model.

In one or more embodiments or examples, determining the agent at step 708 includes determining, using the at least one processor, based on the light parameter, a predictive candidate location associated with a candidate agent. In one or more embodiments or examples, determining the agent at step 708 can include generating, using the at least one processor, based on the scene data and the light parameter, a reverse light tracing result at the predictive candidate location. In one or more embodiments or examples, determining the agent at step 708 can include determining, using the at least one processor, based on the reverse light tracing result, the agent.

The candidate locations can be locations at which agents could, or are likely, to appear. The method 700 can use reverse light tracing. The method 700 can use reverse ray tracing. The method 700 can use camera-based ray tracing.

For example, a light propagation result indicative of a light propagation from a lit surface to another area is simulated on the 3D map. For example a 3D engine is used to simulate the light propagation from the lighted surfaces to other areas, based on volumes, of the scene. Virtual cameras can be placed in the scene to candidate locations at which agents could (or likely) appear. The virtual cameras can be placed at the headlight position of the candidate agents. The virtual cameras are distributed in space and orientation in these areas, such as considering the lane orientation.

The virtual cameras and the corresponding agents can be selected if the virtual cameras collect light similar to their typical output, for example whether there is a correlation on whether an agent would make the light source of the "camera", for example based on a database.

In one or more embodiments or examples, determining the agent at step 708 can include determining, using the at least one processor, based on the sensor data and the light parameter, an agent trajectory parameter indicative of a trajectory of the agent. For example, the method 700 includes ignoring non-relevant agents.

In one or more embodiments or examples, determining the light parameter at step 706 includes determining, using the at least one processor, based on the sensor data and the scene data, a differential scene indicative of differences in light intensity between the environment data and the sensor data. In one or more embodiments or examples, the light parameter can be based on the differential scene.

In one or more embodiments or examples, the sensor data is obtained from one or more of: a camera, a light-intensity sensor, and a LIDAR sensor.

In one or more embodiments or examples, the scene data includes one or more of: a location parameter indicative of a location of the autonomous vehicle, a time parameter indicative of a time of day, and a weather parameter indicative of a weather condition of the environment.

In one or more embodiments or examples, the environment data includes data indicative of one or more predetermined light sources. The environment data can be indicative of the one or more predetermined light sources.

In one or more embodiments or examples, the light parameter is not indicative of the one or more predetermined light sources. In one or more embodiments or examples, the scene data includes a three-dimensional scene data. In one or more embodiments or examples, the light parameter is indicative of an unexpected light intensity in the environment.

In one or more embodiments or examples, determining the scene data at step 704 includes determining, based on one or more of a stereoscopic scene builder, a LIDAR scene builder, and a sensor fusion scene builder, the scene data.

In one or more embodiments or examples, the method 700 includes updating, using the at least one processor, based on the scene data, the environment data. The environment data can be updated based on the temporal scene and the light parameter.

In one or more embodiments or examples, the method 700 includes generating, using the at least one processor, based on the agent, an advance warning indication.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity Also disclosed are methods, non-transitory computer readable media, and systems according to any of the following items:

Item 1. A method comprising:
  obtaining, using at least one processor, sensor data associated with an environment in which an autonomous vehicle is operating;
  determining, using the at least one processor, based on the sensor data and environment data, scene data indicative of an expected scene representative of the environment;
  determining, using the at least one processor, based on the scene data and the sensor data, a light parameter indicative of an unexpected light source in the environment;
  determining, using the at least one processor, based on the light parameter, an agent in the environment; and
  generating, using the at least one processor, based on the agent, a trajectory for the autonomous vehicle.

Item 2. The method of Item 1, wherein determining the agent in the environment comprises determining, using the at least one processor, based on the sensor data and the light parameter, an agent location in the environment.

Item 3. The method of any one of the preceding Items, wherein determining the light parameter comprises:
  determining, using the at least one processor, whether the sensor data meets a criterion; and
  in response to determining that the sensor data meets the criterion, determining, using the at least one processor, that the light parameter indicates a presence of unexpected light in the environment.

Item 4. The method of any one of the preceding Items, wherein determining the agent comprises:
  determining, using the at least one processor, based on the light parameter, a candidate location associated with a candidate agent;
  generating, using the at least one processor, based on the scene data and the light parameter, a light propagation result for the candidate agent at the candidate location; and
  determining, using the at least one processor, based on the light propagation result, the agent.

Item 5. The method of Item 4, wherein determining the light propagation result for the candidate agent at the candidate location is based on a type of agent.

Item 6. The method of Item 5, wherein the type of agent includes one or more of: a vehicle, a car, a motorcycle, a pedestrian, and a bicycle.

Item 7. The method of any one of Items 1-3, wherein determining the agent comprises:
  determining, using the at least one processor, based on the light parameter, a predictive candidate location associated with a candidate agent;
  generating, using the at least one processor, based on the scene data and the light parameter, a reverse light tracing result at the predictive candidate location; and
  determining, using the at least one processor, based on the reverse light tracing result, the agent.

Item 9. The method of any one of the preceding Items, wherein determining the agent comprises determining, using the at least one processor, based on the sensor data and the light parameter, an agent trajectory parameter indicative of a trajectory of the agent.

Item 10. The method of any one of the preceding Items, wherein determining the light parameter comprises:
  determining, using the at least one processor, based on the sensor data and the scene data, a differential scene indicative of differences in light intensity between the environment data and the sensor data;
  wherein the light parameter is based on the differential scene.

Item 11. The method of any one of the preceding Items, wherein the sensor data is obtained from one or more of: a camera, a light-intensity sensor, and a LIDAR sensor.

Item 12. The method of any one of the preceding Items, wherein the scene data includes one or more of: a location parameter indicative of a location of the autonomous vehicle, a time parameter indicative of a time of day, and a weather parameter indicative of a weather condition of the environment.

Item 13. The method of any one of the preceding Items, wherein the environment data includes data indicative of one or more predetermined light sources.

Item 14. The method of Item 13, wherein the light parameter is not indicative of the one or more predetermined light sources.

Item 15. The method of any one of the preceding Items, wherein the scene data comprises a three-dimensional scene data.

Item 16. The method of any one of the preceding Items, wherein the light parameter is indicative of an unexpected light intensity in the environment.

Item 17. The method of any one of the preceding Items, wherein determining the scene data comprises determining, based on one or more of a stereoscopic scene builder, a LIDAR scene builder, and a sensor fusion scene builder, the scene data.

Item 18. The method of any one of the preceding Items, further comprising:
  updating, using the at least one processor, based on the scene data, the environment data.

Item 19. The method of any one of the preceding Items, further comprising:

generating, using the at least one processor, based on the agent, an advance warning indication.

Item 20. A non-transitory computer readable medium comprising instructions stored thereon that, when executed by at least one processor, cause the at least one processor to carry out operations comprising:
- obtaining, using at least one processor, sensor data associated with an environment in which an autonomous vehicle is operating;
- determining, using the at least one processor, based on the sensor data and environment data, scene data indicative of an expected scene representative of the environment;
- determining, using the at least one processor, based on the scene data and the sensor data, a light parameter indicative of an unexpected light source in the environment;
- determining, using the at least one processor, based on the light parameter, an agent in the environment; and
- generating, using the at least one processor, based on the agent, a trajectory for the autonomous vehicle.

Item 21. The non-transitory computer readable medium of Item 20, wherein determining the agent in the environment comprises determining, using the at least one processor, based on the sensor data and the light parameter, an agent location in the environment.

Item 22. The non-transitory computer readable medium of any one of Items 20-21, wherein determining the light parameter comprises:
- determining, using the at least one processor, whether the sensor data meets a criterion; and
- in response to determining that the sensor data meets the criterion, determining, using the at least one processor, that the light parameter indicates a presence of unexpected light in the environment.

Item 23. The non-transitory computer readable medium of any one of Items 20-22, wherein determining the agent comprises:
- determining, using the at least one processor, based on the light parameter, a candidate location associated with a candidate agent;
- generating, using the at least one processor, based on the scene data and the light parameter, a light propagation result for the candidate agent at the candidate location; and
- determining, using the at least one processor, based on the light propagation result, the agent.

Item 24. The non-transitory computer readable medium of Item 23, wherein determining the light propagation result for the candidate agent at the candidate location is based on a type of agent.

Item 25. The non-transitory computer readable medium of Item 24, wherein the type of agent includes one or more of: a vehicle, a car, a motorcycle, a pedestrian, and a bicycle.

Item 26. The non-transitory computer readable medium of any one of Items 20-22, wherein determining the agent comprises:
- determining, using the at least one processor, based on the light parameter, a predictive candidate location associated with a candidate agent;
- generating, using the at least one processor, based on the scene data and the light parameter, a reverse light tracing result at the predictive candidate location; and
- determining, using the at least one processor, based on the reverse light tracing result, the agent.

Item 27. The non-transitory computer readable medium of any one of Items 20-26, wherein determining the agent comprises determining, using the at least one processor, based on the sensor data and the light parameter, an agent trajectory parameter indicative of a trajectory of the agent.

Item 28. The non-transitory computer readable medium of any one of Items 20-27, wherein determining the light parameter comprises:
- determining, using the at least one processor, based on the sensor data and the scene data, a differential scene indicative of differences in light intensity between the environment data and the sensor data;
- wherein the light parameter is based on the differential scene.

Item 29. The non-transitory computer readable medium of any one of Items 20-28, wherein the sensor data is obtained from one or more of: a camera, a light-intensity sensor, and a LIDAR sensor.

Item 30. The non-transitory computer readable medium of any one of Items 20-29, wherein the scene data includes one or more of: a location parameter indicative of a location of the autonomous vehicle, a time parameter indicative of a time of day, and a weather parameter indicative of a weather condition of the environment.

Item 31. The non-transitory computer readable medium of any one of Items 20-30, wherein the environment data includes data indicative of one or more predetermined light sources.

Item 32. The non-transitory computer readable medium of Item 31, wherein the light parameter is not indicative of the one or more predetermined light sources.

Item 33. The non-transitory computer readable medium of any one of Items 20-32, wherein the scene data comprises a three-dimensional scene data.

Item 34. The non-transitory computer readable medium of any one of Items 20-33, wherein the light parameter is indicative of an unexpected light intensity in the environment.

Item 35. The non-transitory computer readable medium of any one of Items 20-34, wherein determining the scene data comprises determining, based on one or more of a stereoscopic scene builder, a LIDAR scene builder, and a sensor fusion scene builder, the scene data.

Item 36. The non-transitory computer readable medium of any one of Items 20-35, further comprising:
- updating, using the at least one processor, based on the scene data, the environment data.

Item 37. The non-transitory computer readable medium of any one of Items 20-36, further comprising:
- generating, using the at least one processor, based on the agent, an advance warning indication.

Item 38. A system, comprising at least one processor; and at least one memory storing instructions thereon that, when executed by the at least one processor, cause the at least one processor to:
- obtain sensor data associated with an environment in which an autonomous vehicle is operating;
- determine, based on the sensor data and environment data, scene data indicative of an expected scene representative of the environment;
- determine, based on the scene data and the sensor data, a light parameter indicative of an unexpected light source in the environment;
- determine, based on the light parameter, an agent in the environment; and
- generate, using the at least one processor, based on the agent, a trajectory for the autonomous vehicle.

Item 39. The system of Item 38, wherein to determine the agent in the environment comprises to determine, based on the sensor data and the light parameter, an agent location in the environment.

Item 40. The system of any one of Items 38-39, wherein to determine the light parameter comprises:
  to determine, whether the sensor data meets a criterion; and
  in response to determining that the sensor data meets the criterion, to determine that the light parameter indicates a presence of unexpected light in the environment.

Item 41. The system of any one of Items 38-40, wherein to determine the agent comprises:
  to determine, based on the light parameter, a candidate location associated with a candidate agent;
  to generate, based on the scene data and the light parameter, a light propagation result for the candidate agent at the candidate location; and
  to determine, based on the light propagation result, the agent.

Item 42. The system of Item 41, wherein to determine the light propagation result for the candidate agent at the candidate location is based on a type of agent.

Item 43. The system of Item 42, wherein the type of agent includes one or more of: a vehicle, a car, a motorcycle, a pedestrian, and a bicycle.

Item 44. The system of any one of Items 38-40, wherein to determine the agent comprises:
  to determine, based on the light parameter, a predictive candidate location associated with a candidate agent;
  to generate, based on the scene data and the light parameter, a reverse light tracing result at the predictive candidate location; and
  to determine, based on the reverse light tracing result, the agent.

Item 45. The system of any one of Items 38-44, wherein to determine the agent comprises to determine, based on the sensor data and the light parameter, an agent trajectory parameter indicative of a trajectory of the agent.

Item 46. The system of any one of Items 38-45, wherein to determine the light parameter comprises:
  to determine, based on the sensor data and the scene data, a differential scene indicative of differences in light intensity between the environment data and the sensor data;
  wherein the light parameter is based on the differential scene.

Item 47. The system of any one of Items 38-46, wherein the sensor data is obtained from one or more of: a camera, a light-intensity sensor, and a LIDAR sensor.

Item 48. The system of any one of Items 38-47, wherein the scene data includes one or more of: a location parameter indicative of a location of the autonomous vehicle, a time parameter indicative of a time of day, and a weather parameter indicative of a weather condition of the environment.

Item 49. The system of any one of Items 38-48, wherein the environment data includes data indicative of one or more predetermined light sources.

Item 50. The system of Item 49, wherein the light parameter is not indicative of the one or more predetermined light sources.

Item 51. The system of any one of Items 38-50, wherein the scene data comprises a three-dimensional scene data.

Item 52. The system of any one of Items 38-51, wherein the light parameter is indicative of an unexpected light intensity in the environment.

Item 53. The system of any one of Items 38-52, wherein to determine the scene data comprises to determine, based on one or more of a stereoscopic scene builder, a LIDAR scene builder, and a sensor fusion scene builder, the scene data.

Item 54. The system of any one of Items 38-53, wherein the at least one memory storing instructions thereon, when executed by the at least one processor, causes the at least one processor to:
  update, based on the scene data, the environment data.

Item 55. The system of any one of Items claims 38-54, wherein the at least one memory storing instructions thereon, when executed by the at least one processor, causes the at least one processor to:
  generate, based on the agent, an advance warning indication.

What is claimed is:

1. A method comprising:
  obtaining, using at least one processor, sensor data associated with an environment in which an autonomous vehicle is operating;
  identifying, using the at least one processor, at least one light source in the environment based on the sensor data;
  determining, using the at least one processor, scene data based on the sensor data associated with the environment, wherein the scene data includes one or more predetermined light sources in the environment;
  determining, using the at least one processor, whether the at least one light source corresponds to at least one of the one or more predetermined light sources associated with the scene data;
  in response to determining that the at least one light source does not correspond to at least one of the one or more predetermined light sources, identifying, using the at least one processor, the at least one light source as at least one unexpected light source in the environment;
  identifying, using the at least one processor, an agent in the environment based on the at least one unexpected light source;
  generating, using the at least one processor, a trajectory for the autonomous vehicle based on the identified agent; and
  controlling operation of the autonomous vehicle based on the generated trajectory.

2. The method of claim 1, wherein identifying the agent in the environment comprises determining, using the at least one processor, based on the sensor data and the at least one unexpected light source, an agent location in the environment.

3. The method of claim 1, wherein identifying the agent comprises:
  determining, using the at least one processor, based on the at least one unexpected light source, a candidate location associated with a candidate agent;
  generating, using the at least one processor, based on the scene data and the at least one unexpected light source, a light propagation result for the candidate agent at the candidate location; and
  identifying, using the at least one processor, based on the light propagation result, the agent.

4. The method of claim 3, wherein generating the light propagation result for the candidate agent at the candidate location is based on a type of agent.

5. The method of claim 4, wherein the type of agent includes one or more of: a vehicle, a car, a motorcycle, a pedestrian, and a bicycle.

6. The method of claim 1, wherein identifying the agent comprises:
determining, using the at least one processor, based on the at least one unexpected light source, a predictive candidate location associated with a candidate agent;
generating, using the at least one processor, based on the scene data and the at least one unexpected light source, a reverse light tracing result at the predictive candidate location; and
identifying, using the at least one processor, based on the reverse light tracing result, the agent.

7. The method of claim 1, wherein identifying the agent comprises determining, using the at least one processor, based on the sensor data and the at least one unexpected light source, an agent trajectory parameter indicative of a trajectory of the agent.

8. The method of claim 1, wherein identifying the at least one light source comprises:
determining, using the at least one processor, based on the sensor data and the scene data, a differential scene indicative of differences in light intensity between the scene data and the sensor data; and
identifying the at least one light source is based on the differential scene.

9. The method of claim 1, wherein the sensor data is obtained from one or more of: a camera, a light-intensity sensor, and a LIDAR sensor.

10. The method of claim 1, wherein the scene data includes one or more of: a location parameter indicative of a location of the autonomous vehicle, a time parameter indicative of a time of day, and a weather parameter indicative of a weather condition of the environment.

11. The method of claim 1, wherein the scene data comprises a three-dimensional scene data.

12. The method of claim 1, wherein determining the scene data comprises determining, based on one or more of a stereoscopic scene builder, a LIDAR scene builder, and a sensor fusion scene builder, the scene data.

13. The method of claim 1, further comprising:
generating, using the at least one processor, based on the agent, an advance warning indication.

14. A non-transitory computer readable medium comprising instructions stored thereon that, when executed by at least one processor, cause the at least one processor to carry out operations comprising:
obtaining, using at least one processor, sensor data associated with an environment in which an autonomous vehicle is operating;
identifying, using the at least one processor, at least one light source in the environment based on the sensor data;
determining, using the at least one processor, scene data based on the sensor data associated with the environment, wherein the scene data includes one or more predetermined light sources in the environment;
determining, using the at least one processor, whether the at least one light source corresponds to at least one of the one or more predetermined light sources associated with the scene data; in response to determining that the at least one light source does not correspond to at least one of the one or more predetermined light sources, identifying, using the at least one processor, the at least one light source as an at least one unexpected light source in the environment;
identifying, using the at least one processor, an agent in the environment based on the at least one unexpected light source;
generating, using the at least one processor, a trajectory for the autonomous vehicle based on the identified agent; and
controlling, using the at least one processor, operation of the autonomous vehicle based on the generated trajectory.

15. A system, comprising at least one processor; and at least one memory storing instructions thereon that, when executed by the at least one processor, cause the at least one processor to:
obtain sensor data associated with an environment in which an autonomous vehicle is operating;
identify at least one light source in the environment based on the sensor data;
determine scene data based on the sensor data associated with the environment, wherein the scene data includes one or more predetermined light sources in the environment;
determine whether the at least one light source corresponds to at least one of the one or more predetermined light sources associated with the scene data;
in response to determining that the at least one light source does not correspond to at least one of the one or more predetermined light sources, identify the at least one light source as at least one unexpected light source in the environment;
identify an agent in the environment based on the at least one unexpected light source;
generate a trajectory for the autonomous vehicle based on the identified agent; and
control operation of the autonomous vehicle based on the generated trajectory.

* * * * *